Feb. 20, 1934.  R. L. READING  1,947,546
APPARATUS FOR TREATING MATERIALS
Filed Oct. 15, 1931  2 Sheets-Sheet 1

INVENTOR
R. L. READING
BY
H. A. Whitehorn
ATTORNEY

Patented Feb. 20, 1934

1,947,546

UNITED STATES PATENT OFFICE 1,947,546

APPARATUS FOR TREATING MATERIALS

Raymond L. Reading, Maywood, Ill., assignor to Western Electric Company, Incorporated, New York, N. Y., a corporation of New York Application October 15, 1931. Serial No. 568,985

15 Claims. (Cl. 91—55)

This invention relates to an apparatus for treating materials and more particularly to an apparatus for treating material applied to a filiform core.

An object of the invention is to provide a simple and effective apparatus for heating a coating applied to a filiform core, such as a strand or a ribbon, and in particular for baking a coat of enamel on wire.

One embodiment of the invention is characterized primarily by the use of a combustion chamber and a baking chamber having a common heat transmitting wall. Combustible vapors evolved by heat from a raw enamel coated wire passing through the baking chamber are drawn by the inspirator action of a properly positioned gas jet through a connecting passage and nozzle from the baking chamber into the combustion chamber and there burned to supply heat for the baking chamber. A secondary feature of the invention is automatic control of the gas supply to the inspirator by means of a pyrometer or other heat actuated device located preferably in the baking chamber or in some cases in the combustion chamber. Another secondary feature of the invention is the provision of the wire exit passage from the baking chamber with baffles to control the flow of air drawn into the system by the inspirator.

Another embodiment of the invention is characterized by the use of a tubular baking chamber surrounded by an annular combustion chamber together with an air blast directed from the baking chamber into the combustion chamber through a communicating aperture or passage located in the middle third of the common wall of the two chambers for the purpose of transferring combustible vapors evolved from a raw enamel coated wire passing through the baking chamber, into the combustion chamber, where the vapors are burned to provide heat for the baking chamber.

Figure 1:
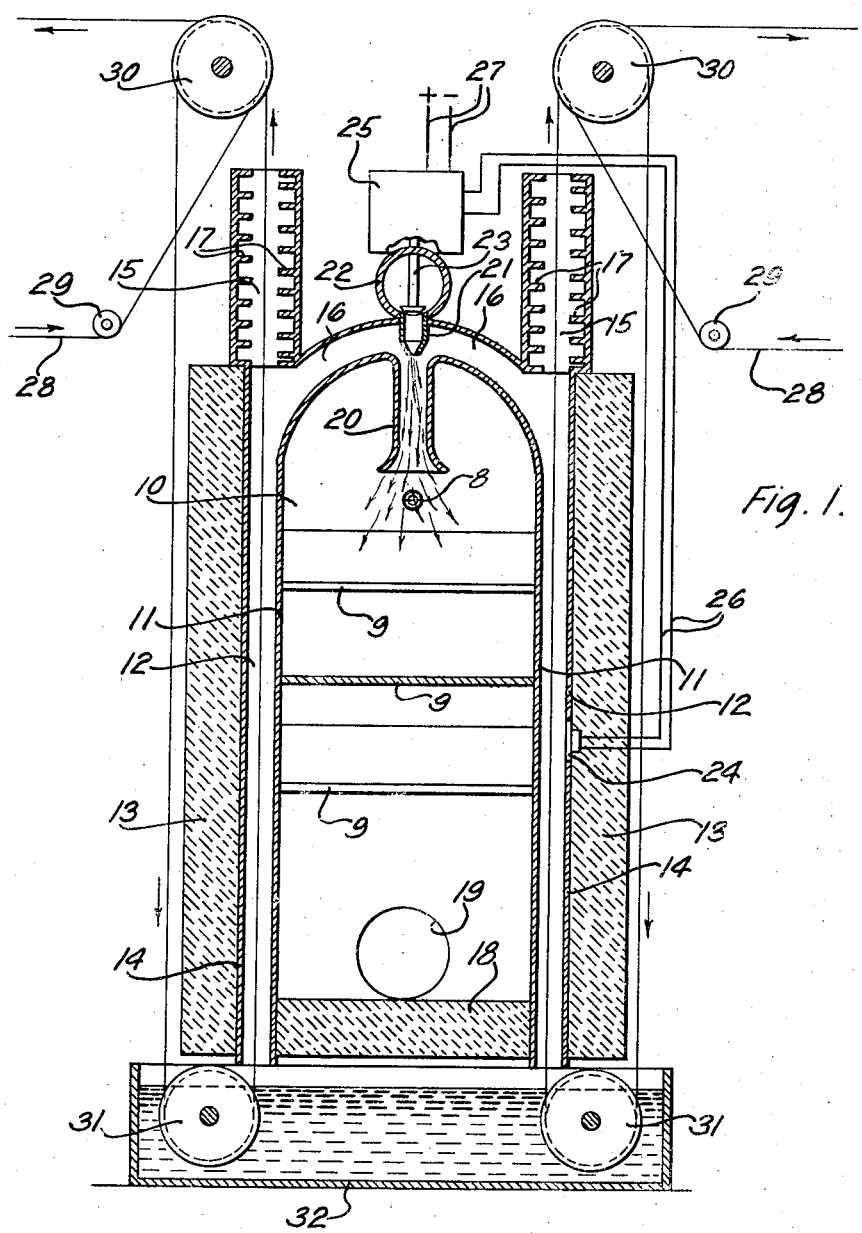
Figure 2:
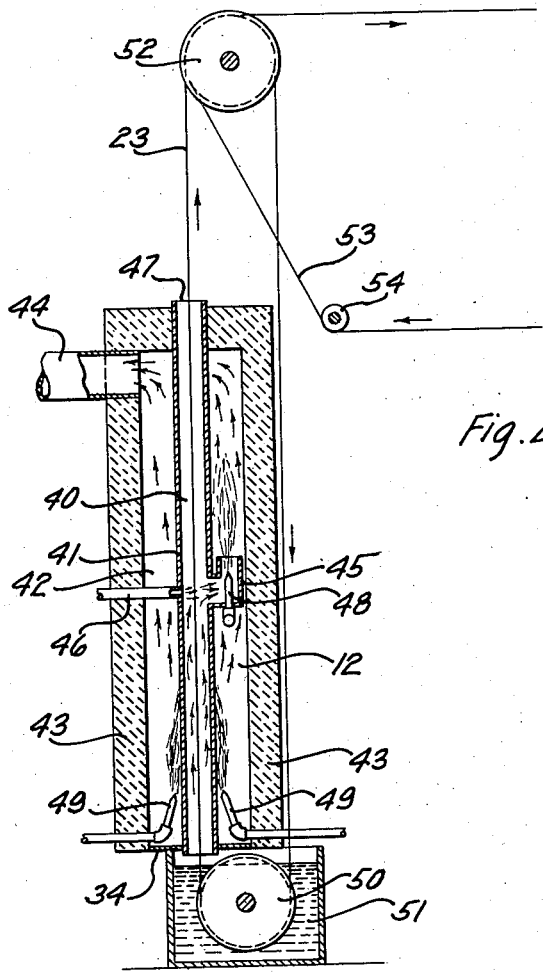

Other objects and features of the invention will be apparent from the following detailed description and from the appended drawings in which Fig. 1 is a schematic, longitudinal, central section of an apparatus presenting one embodiment of the invention, and Fig. 2 is a schematic, longitudinal, central section of an apparatus presenting another embodiment of the invention.

In carrying out the invention as illustrated in Fig. 1, there is provided a combustion chamber 10, having side walls 11—11 of any appropriate heat resisting and heat conductive material, such as cast iron, cast aluminum, molded clay, alundum, or the like. These walls 11—11 are also the inner walls of a pair of twin tubular baking chambers 12—12, whose outer walls 13—13 are composed of any appropriate heat insulating material, such as fire brick, asbestos, cement, or the like, and are lined with a smooth heat reflecting lining 14—14 of material similar to that of the walls 11—11. The baking chambers are open at the bottom and at the top open directly into wire exit passages 15—15 and also into a common arched vapor passage 16 formed in the roof of the combustion chamber 10.

The wire exit passages 15—15 are provided with air baffles 17—17 to control the inflow of air through the passages.

The combustion chamber 10 is closed at the bottom by a floor 18 of material similar to that of the walls 13—13 and is provided near the bottom with an exhaust flue 19 to carry combustion products away from the chamber and which may be connected to an exhaust fan, a stack or other draft inducing means. Within the combustion chamber are a plurality of baffles 9 which aid in distributing the hot gases and produce even heating of all portions of the baking chambers.

The lower side of the arched passage 16 is provided, at its crown, with an inspirator nozzle 20 opening from the passage 16 into the chamber 10. In the upper side of the passage 16 is located a pressure gas nozzle 21 opposite to the inspirator nozzle 20 and for coaction therewith. The pressure nozzle 21 communicates with and is fed from a pressure gas main 22 connected to a source (not shown) of gas under pressure. A spark plug 8 or similar means may be provided for initially igniting the combustible mixture in chamber 10.

The flow of gas through the nozzle 21 and consequently the effectiveness of the inspirator 20 is controlled by any suitable means, here shown as a mushroom valve 23, which in turn is automatically controlled by a heat responsive device 24 preferably positioned in a wall of the baking chamber 12. The precise nature of the means by which temperature variations of the device 24 are converted into motions of the valve 23 is not pertinent to the present invention, but such devices for temperature regulation are well known to those skilled in the art and are of many kinds, therefore such device is here indicated merely diagrammatically by a box 25 to contain the device and electrical connections 26 and supply 27.

A wire 28 to be enamelled passes from a supply (not shown) over a tension pulley 29, thence over an idler sheave 30, down outside the apparatus and under an idler sheave 31 immersed in a bath 30 of raw enamel containing a volatile combustible ingredient, such as gasoline, alcohol, acetone, or the like, thence upward through the baking chamber 12, the wire exit passage 15 and over a second idler sheave 30 beside the first to a take-up device not shown.

As the wire coated with raw enamel passes through the lower portion of the chamber 12, the volatile ingredient of the enamel is vaporized by the heat radiated from the wall 11 and reflected from the wall 14, and the residual enamel is baked hard by the heat of the upper portion of the chamber 12. The vapors evolved are drawn up through the chamber 12 and the passage 16 by the inspirator action of the elements 20 and 21 and forced into the combustion chamber 10 where they are burned to provide heat for the baking chamber 12. At the same time air is drawn in through the wire exit passages 15 and mixed with the vapors to supply oxygen for the combustion of the vapors and of the gas from the nozzle 21, and also to cool the countermoving finished wire.

If conditions require, the gas main 22 may be connected to a supply of pressure air (not shown) as well as to a supply of pressure gas.

Instead of passing only once through the chamber 12, the wire may pass from a second sheave 30 to a second sheave 31 on the same shaft and through the chamber 12 a second time to a third sheave 30. By a repetition of this arrangement the wire may be given as many successive coats of enamel as may be desired. The baking chambers may be single chambers or comprise a plurality of chambers, each handling the wires from a single supply spool or groups of wires for the various passes, thereby permitting differential baking of the various coats of enamel.

In carrying out the invention as illustrated in Fig. 2, there is provided an open ended, tubular baking chamber 40 having walls 41 of any desired, circular, rectangular, or other cross-section and constructed of any approved heat resisting and transmitting material, such as cast iron, cast aluminum, molded clay, alundum, or the like. The chamber 40 is surrounded by a combustion chamber 42, of annular cross section, bounded inwardly by the outer walls 41 of the baking chamber and outwardly by heat insulating walls 43 of any approved construction. The combustion chamber 42 is closed at its upper end except for an exhaust outlet 44, through which combustion products formed in the chamber 42 may be drawn off by a suction fan, stack or other approved means, or may simply be allowed to escape.

About midway of its length, the baking chamber 40 is provided with an elbow pipe 45 opening horizontally from the chamber 40 and extending upwardly within the chamber 42. This elbow 45 is located according to circumstances in the middle of the chamber 40 or a little above or below the middle but generally within the middle third of the length of chamber 40. An air supply nozzle 46 passes horizontally through the wall 41 of the chamber 40 diametrically across the chamber 40 from the opening of the elbow 45, and is connected to a source of compressed air (not shown). The parts 45 and 46 are so proportioned and arranged that the jet of air from the nozzle 46 enters the elbow 45 drawing with it the gaseous contents of the chamber 40, which consist partly of inflammable vapors evolved as hereinafter described in the lower half of the chamber 40 and partly of air drawn into the upper open end 47 of the chamber 40 by the exhausting effect of the air jet from the nozzle 46 below.

A burner 48, which may be a Bunsen gas burner or of any other approved type (fed from a source not shown) extends through the bottom of the elbow 45 into the upturned arm thereof and serves to ignite the mixture of air and combustible vapors passing through the elbow 45.

One or more similar burners 49 are located within the chamber 42 near the bottom thereof to heat the lower part of the chamber 40. The bottom of chamber 42 is closed by a plate 34 to prevent ingress of air and fumes from bath 51 and prevent the fumes from being ignited by the burners.

Below the open bottom end of the chamber 40 is positioned a sheave 50 which dips into the bath 51 of raw enamel comprising a volatile combustible ingredient, such as gasoline, benzol, alcohol, acetone, or the like. A corresponding sheave 52 is positioned above the open upper end of the chamber 40. The sheaves 50 and 52 are positioned so that one of their common tangents passes centrally through the length of the chamber 40.

When the apparatus is in operation, a wire 53 to be enameled is fed by means (not shown) from a supply (not shown) to pass over a tensioning pulley 54, thence over a first sheave 52, down outside the combustion chamber, through the bath 51 under the sheave 50, up through the baking chamber 40 and over a second sheave 52 beside the first to a take-up device or other propelling means (not shown).

As it passes through the bath 51, the wire picks up a coat of raw enamel, and in the lower part of the chamber 40 heated by the burners 49 the volatile combustible ingredient of the raw enamel is vaporized. The vapors thus evolved are carried, by the injector action of the air jet from the nozzle 46, through the elbow 45 into the upper part of the combustion chamber 42 and, being mixed with air from the nozzle 46 and also with air drawn down through the top opening 47 of the baking chamber, and being ignited by the burner 48, burn around the wall 41 of the upper half of the baking chamber 40 supplying enough heat to bake the residual enamel on the wire as it passes through the upper half of the baking chamber. The counter flowing current of cold air drawn into the top of the baking chamber by the air jet from the nozzle 46 serves to cool the baked enamelled wire as it passes out of the chamber 40.

The amount of air entering through the nozzle 46 and of gas and air entering through the burners 48 and 49 can be so regulated by stop cocks or other familiar means (not shown) that the combustion in the upper half of the chamber 42 is substantially complete and the gaseous combustion products discharged through the flue 14 are inoffensive and harmless.

It is evident that the sheaves 50 and 52 may be multiple and that thus the wire passing over the second sheave 52 may be brought down over a second sheave 50 beside the first and up through the baking chamber a second time to be given a second coat of enamel, and that this arrangement may be repeated and the wire given as many coats of enamel as may seem desirable before it finally passes off from the last of a plurality of sheaves 52.

Under certain circumstances of composition of the raw enamel, it may not be necessary to supply either additional air of fuel through the burner 48 after the apparatus has attained working temperatures as the vapors evolved from the raw enamel may be sufficient to burn completely in the air supplied by means of the injector nozzle 46 and supply all the heat necessary for the upper half of the baking chamber. In such cases the burner 48 may be completely shut off after the process is well started.

Also, for some kinds of work, it may be more satisfactory to substitute an electric resistance heater for the burners 49 to heat the lower half of the chamber 40.

It is thus evident that the embodiments shown are only illustrative and may be modified in many ways without departing from the scope and spirit of the invention, as pointed out and defined in the appended claims.

What is claimed is:

1. An apparatus for treating filiform cores comprising means to apply material containing a volatile combustible ingredient to a core, a tubular baking chamber through which the core passes, a combustion chamber associated with the baking chamber, and a communicating passage into the combustion chamber from the baking chamber located only in the middle third of the latter.

2. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located in the middle third of the latter, and means to transfer gases and vapors from the baking chamber through the passage into the combustion chamber.

3. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber, and means to transfer gases and vapors from the baking chamber through the passage into the combustion chamber including a compressed air jet positioned in the opposite wall of the baking chamber and directed into the passage.

4. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located in the middle third of the latter, means to transfer gases and vapors from the baking chamber through the passage into the combustion chamber, and means in the combustion chamber to ignite such gases and vapors transferred thereinto.

5. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located in the middle third of the latter, means to transfer gases and vapors from the baking chamber through the passage into the combustion chamber including a compressed air jet positioned in the opposite wall of the baking chamber and directed into the passage, and means in the combustion chamber to ignite such gases and vapors transferred thereinto.

6. An apparatus for treating filiform cores comprising means to apply material containing a volatile combustible ingredient to a core, a tubular baking chamber through which the core passes, a combustion chamber associated with the baking chamber, and a tubular passage opening laterally from the baking chamber and debouching vertically into the combustion chamber.

7. An apparatus or treating filiform cores comprising means to apply material containing a volatile combustible ingredient to a core, a tubular baking chamber through which the core passes, a combustion chamber associated with the baking chamber, a tubular passage opening laterally from the baking chamber and debouching vertically into the combustion chamber, and means to transfer gases and vapors from the baking chamber into the combustion chamber through the passage.

8. An apparatus for treating filiform cores comprising means to apply material containing a volatile combustible ingredient to a core, a tubular baking chamber through which the core passes, a combustion chamber associated with the baking chamber, a tubular passage opening laterally from the baking chamber and debouching vertically into the combustion chamber, and means to transfer gases and vapors from the baking chamber into the combustion chamber through the passage including a compressed air jet positioned in the opposite wall of the baking chamber and directed into the passage.

9. An apparatus for treating filiform cores comprising means to apply material containing a volatile combustible ingredient to a core, a tubular baking chamber through which the core passes, a combustion chamber associated with the baking chamber, a tubular passage opening laterally from the baking chamber and debouching vertically into the combustion chamber, means to transfer gases and vapors from the baking chamber into the combustion chamber through the passage, and means in the passage to ignite such gases and vapors.

10. An apparatus for treating filiform cores comprising means to apply material containing a volatile combustible ingredient to a core, a tubular baking chamber through which the core passes, a combustion chamber associated with the baking chamber, a tubular passage opening laterally from the baking chamber and debouching vertically into the combustion chamber, means to transfer gases and vapors from the baking chamber into the combustion chamber through the passage including a compressed air jet positioned in the opposite wall of the baking chamber and directed into the aperture, and means in the passage to ignite such gases and vapors.

11. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located only in the middle of third of the latter, and means to heat the lower portion of the baking chamber.

12. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located only in the middle third of the latter, means to heat the lower portion of the baking chamber, and means to transfer gases and vapors from the baking chamber through the passage into the combustion chamber.

13. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located in the middle third of the latter, means to heat the lower portion of the baking chamber, and means to transfer gases and vapors from the baking chamber through the passage into the combustion chamber including a compressed air jet positioned in the opposite wall of the baking chamber and directed into the passage.

14. An apparatus for treating filiform cores comprising means to apply material containing a volatile combustible ingredient to a core, a tubular baking chamber through which the core passes, a combustion chamber associated with the baking chamber, a communicating passage into the combustion chamber from the baking chamber located in the middle third of the latter, means to heat the lower portion of the baking chamber, means to transfer gases and vapors from the baking chamber through the passage into the combustion chamber including a compressed air jet positioned in the opposite wall of the baking chamber and directed into the passage, and means in the combustion chamber to ignite such gases and vapors transferred thereinto.

15. An apparatus for treating filiform cores comprising means to apply material containing a volatile combustible ingredient to a core, a tubular baking chamber through which the core passes, a combustion chamber associated with the baking chamber, a tubular passage opening laterally from the baking chamber and debouching vertically into the combustion chamber, means to transfer gases and vapors from the baking chamber into the combustion chamber through the passage, means in the passage to ignite such gases and vapors, and means to heat the lower portion of the baking chamber.

RAYMOND L. READING.